(12) United States Patent
Ikeda et al.

(10) Patent No.: US 7,529,445 B2
(45) Date of Patent: May 5, 2009

(54) LIGHT GUIDE AND LINE ILLUMINATOR

(75) Inventors: Makoto Ikeda, Osaka (JP); Hiroyuki Nemoto, Osaka (JP)

(73) Assignee: Nippon Sheet Glass Co., Ltd, Osaka (JP)

( * ) Notice: Subject to any disclaimer, the term of this patent is extended or adjusted under 35 U.S.C. 154(b) by 188 days.

(21) Appl. No.: 10/562,336

(22) PCT Filed: Jun. 18, 2004

(86) PCT No.: PCT/JP2004/008621

§ 371 (c)(1),
(2), (4) Date: Dec. 23, 2005

(87) PCT Pub. No.: WO2005/001528

PCT Pub. Date: Jan. 6, 2005

(65) Prior Publication Data

US 2006/0159393 A1    Jul. 20, 2006

(30) Foreign Application Priority Data

Jun. 25, 2003   (JP) .............................. 2003-181626

(51) Int. Cl.
*G02B 6/26* (2006.01)
*F21V 7/04* (2006.01)
(52) U.S. Cl. .......................... 385/31; 385/146; 362/628
(58) Field of Classification Search ................. 362/555, 362/602, 612, 613, 615, 628; 385/31, 146
See application file for complete search history.

(56) References Cited

U.S. PATENT DOCUMENTS

| 5,255,171 | A | * | 10/1993 | Clark | .......................... 362/231 |
|---|---|---|---|---|---|
| 5,629,996 | A | | 5/1997 | Rizkin et al. | |
| 5,967,653 | A | * | 10/1999 | Miller et al. | ................. 362/580 |
| 6,028,535 | A | | 2/2000 | Rizkin | |
| 6,259,082 | B1 | | 7/2001 | Fujimoto et al. | |
| 6,937,791 | B2 | * | 8/2005 | Guy | ............................. 385/33 |
| 6,939,009 | B2 | * | 9/2005 | Fischer et al. | ................. 353/43 |

(Continued)

FOREIGN PATENT DOCUMENTS

| JP | 2001135116 | 5/2001 |
|---|---|---|
| JP | 2001-268320 | 9/2001 |
| JP | 2001-330734 | 11/2001 |
| WO | WO9720169 | 6/1997 |

OTHER PUBLICATIONS

Title of book—No. 6, Pencil of Light 5: Non-Image Forming Light Concentrating Optical System Author—Tadao Tsuruta.

*Primary Examiner*—John A Ward
(74) *Attorney, Agent, or Firm*—Carrier, Blackman & Associates, P.C.; Joseph P. Carrier; William D. Blackman

(57) ABSTRACT

A light guide emits lights incident on an end face from an emitting face extending longitudinally of the guide, while having the lights reflected by its internal face. A sectional shape of the guide in a direction orthogonal to the longitudinal direction of this light guide has two opposite parabolas, a line segment connecting the focal points of the two opposite parabolas, and a line segment (bottom face) corresponding to the emitting face. A scattering pattern consisting of white ink is formed on the line segment (bottom face) connecting the focal points. With this guide, the face of a document is to be efficiently illuminated by conversely utilizing the characteristic of the compound parabolic concentrator (CPC) to convert scattered lights extending over a full angle from a limited area into radiant lights confined to a prescribed emission angle and thereby minimizing the expansion of lights.

17 Claims, 6 Drawing Sheets

U.S. PATENT DOCUMENTS 7,284,891 B2 * 10/2007 Saito et al. .................. 362/615
2001/0035986 A1 11/2001 Ikeda
2003/0075690 A1 4/2003 Yahiro
2005/0127307 A1 6/2005 Yahiro

* cited by examiner

LIGHT GUIDE AND LINE ILLUMINATOR

CROSS-REFERENCE TO RELATED APPLICATIONS

The present invention is the US National Phase of International Application PCT/JP2004/008621, filed 18 Jun. 2004, which claims priority under 35 USC 119 based on Japanese patent application No. 2003-181626, filed 25 Jun. 2003. The entire contents of the International and priority Japanese applications are incorporated herein by reference.

TECHNICAL FIELD

The present invention relates to a light guide for illuminating documents in a line shape in facsimile machines, copying machines, scanners and the like, and an image reader having this light guide incorporated therein.

BACKGROUND ART

There is proposed, for the purpose of effectively irradiating the object of irradiation with lights from light sources, an illuminator that uses a light guide whose section is a paraboloid (see Patent Document 1 for instance).

There is also known a compound parabolic concentrator (CPC) which is intended to enhance the efficiency of concentration with no regard for image formation performance (Non-Patent Document 1).

Patent Document 1: Japanese Patent Laid-Open No. 2001-330734

Non-Patent Document 1: Title of book—No. 6, Pencil of Light 5: Non-Image Forming Light Concentrating Optical System; Author—Tadao Tsuruta Lights emitted from a light guide expand. As a result, where the distance between the document and the emitting face is great, the illumination of the face of the document may decline, which is not desirable.

Incidentally, as stated in Non-Patent Document 1, a compound parabolic concentrator (CPC) is an optical system devised for efficient concentration of lights, and has a characteristic that all the lights incident on the light receiving face at an angle of incidence not greater than θ concentrate on the light concentration face.

Then, an object of the present invention is to provide a light guide capable of minimizing the expansion of light by conversely utilizing the characteristic of the compound parabolic concentrator (CPC) to convert scattered lights extending over a full angle from a limited area into radiant lights confined to a prescribed emission angle and using them as an optical system efficiently illuminating the face of the document, and a line illuminator using that light guide.

SUMMARY OF THE INVENTION

A light guide according to an embodiment of the invention for solving the problem noted above emits lights incident on an end face from an emitting face disposed along the longitudinal direction while having the lights reflected by the internal face thereof, wherein the sectional shape of the light guide in a direction orthogonal to the longitudinal direction of this light guide has two opposite parabolas, a line segment connecting the focal points of the two opposite parabolas and a line segment corresponding to the emitting face. The face containing the line segment connecting the focal points of the two opposite parabolas constitutes the reflective face and the face opposite to this reflective face constitutes the emitting face.

The configuration described above makes it possible to restrain the expansion of lights emitted from the emitting face. In order to emit lights most efficiently, it is preferable to arrange the side faces of the light guide on the emitting face side substantially in parallel with the optical axis.

An image reader according to an embodiment of the invention has two, for instance, of illuminating units each including the light guide with a light source on one end or both ends of the light guide, and the illuminating units are so arranged as to cause lights emitted from the emitting faces of the guides to irradiate the same area of the face of the document to be illuminated.

Advantages of the Invention

The light guide according to the invention and the line illuminator using that light guide, since they conversely utilize the characteristic of the compound parabolic concentrator (CPC) to convert diffused lights extending over a full angle from a limited area into radiant lights confined to a prescribed emission angle and use them as an optical system efficiently illuminating the face of the document, can minimize the expansion of lights. This makes it possible to efficiently illuminate the face of the document.

DETAILED DESCRIPTION OF THE INVENTION

Figure 1:
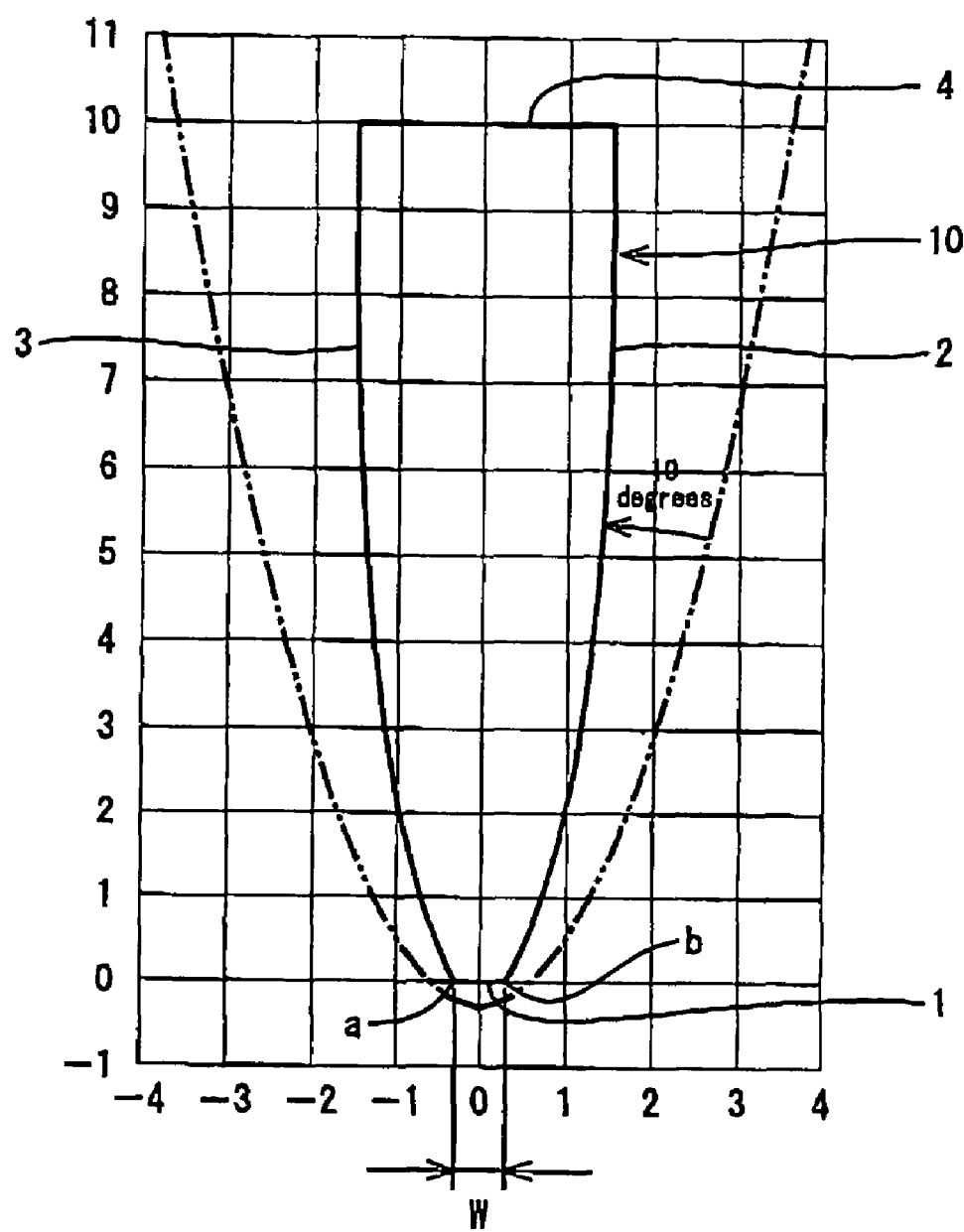
FIG. 1 is a diagram showing the sectional shape of the light guide according to the present invention having a compound parabolic shape.
Figure 2:
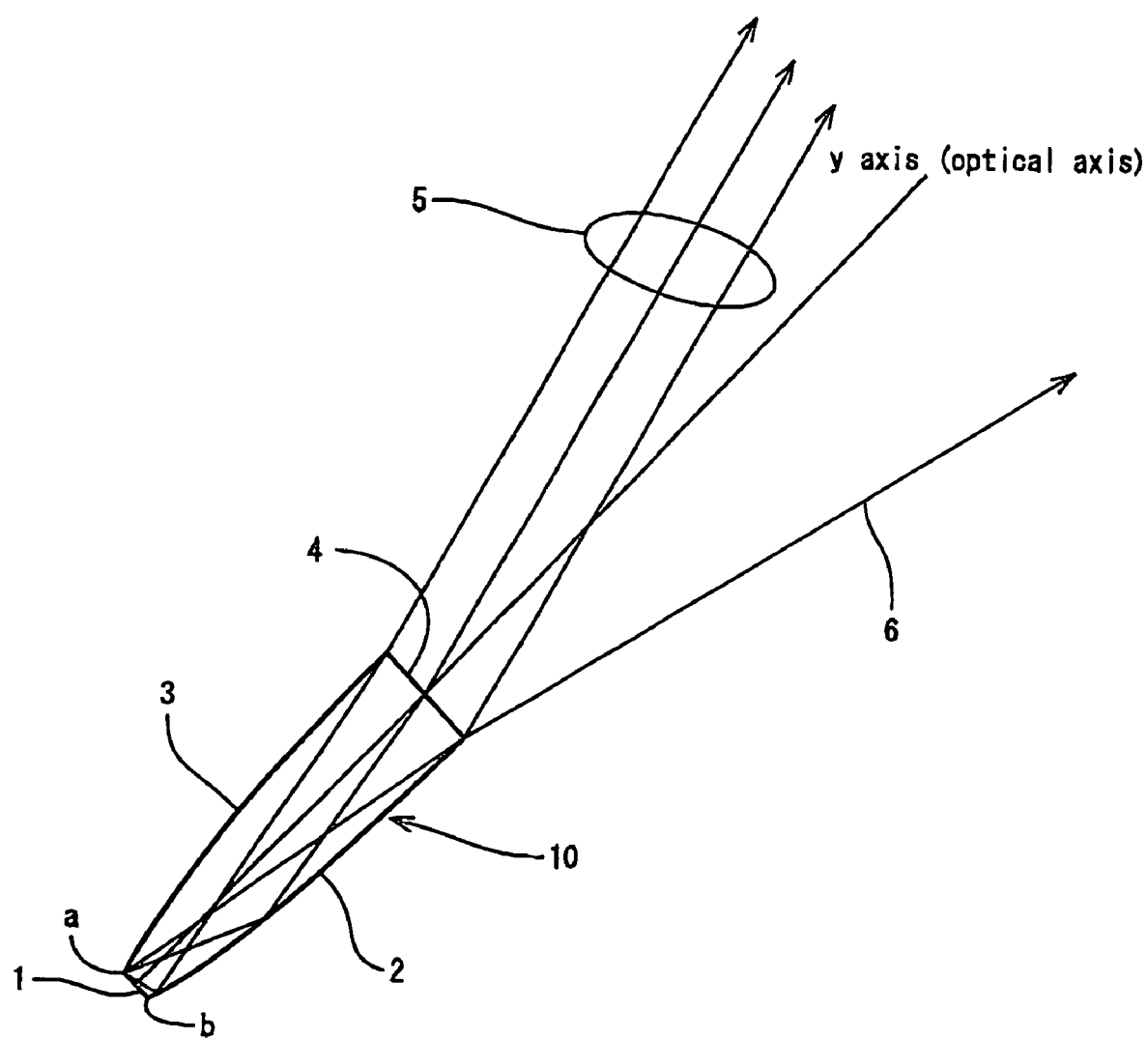
FIG. 2 is a diagram showing the emitted lights of the light guide according to the invention shown in FIG. 1.

The best modes for carrying out the present invention will be described below with reference to the accompanying drawings. FIG. 1 shows the sectional shape of a light guide according to the invention having a compound parabolic shape. FIG. 2 is a diagram showing the emitted lights of the light guide according to the invention shown in FIG. 1.

A light guide 10 is formed of a transparent resin, such as acryl for instance, and its sectional shape is constant over the full length (e.g. 320 mm) of the light guide 10.

The emitting face 4 of the light guide 10 has a larger width than that of the bottom face 1 of the light guide 10. The bottom face 1 of the light guide 10 measures 0.52 mm in width, and a scattering pattern consisting of white ink or fine convexes and concaves is formed on this bottom face 1. The scattering pattern is formed in dots for instance.

This scattering pattern may be formed all over the bottom face 1, but the area in which the scattering pattern is formed may also become greater with an increase in distance from the end face on which lights from light sources, not shown, come incident.

A side face 2 is part of a curve resulting from the rotation of a quadratic curve ($y=0.81927x^2-0.30515$) represented by a virtual line around the origin $(x, y)=(0, 0)$ as the center of rotation by $\theta=10$ degrees and displaced in parallel by $-W1/2=-0.26$ mm in the direction of the x axis (the range of y: $0 \leq y \leq 9.97$). By inclining the quadratic curve represented by the virtual line, the side face 2 on the emitting face 4 side is made substantially parallel to the y axis (the optical axis). A side face 3 is a curve symmetric to the side face 2 with respect to the y axis.

In this case, the coordinate $(x, y)=(-0.26, 0)$ is the focal point a of the side face 2, which is a paraboloid. As shown in FIG. 2, out of the scattered lights from this focal point a, lights having directly reached the side face 2 satisfy every condition of reflection, and reach the emitting face 4 as parallel lights inclined at 10 degrees to the y axis within the light guide 10.

Where the light guide 10 is made of acryl whose refractive index $n=1.49$: $1.49 \cdot \sin 10° = \sin \theta d$ (Snell's law)

Hence $\theta d=15°$.

Therefore, like the light ray represented by reference numeral 5 in FIG. 2, parallel lights inclined at 15 degrees to the y axis are emitted from the emitting face 4.

On the other hand, out of the scattered lights from the focal point a, lights having directly reached the emitting face 4 are inclined by $-15$ degrees to the y axis when they pass the coordinate $(x, y)=(1.50, 9.97)$ like the light ray represented by reference numeral 6 in FIG. 2.

Similarly, the coordinate $(x, y)=(0.26, 0)$ is the focal point b of the side face 3, which is a paraboloid. Out of the scattered lights from this focal point b, lights having directly reached the side face 3 satisfy every condition of reflection, and reach the emitting face 4 as parallel lights inclined at $-10$ degrees to the y axis within the light guide 10.

Therefore, scattered lights from the section $(-0.26 \leq x \leq 0.26, y=0)$ (namely the scattered lights from the bottom face 1), including the reflection of the scattered lights directly reaching the side face 3, are confined to a range of ±15 degrees to the y axis.

This makes it possible to prevent the expansion of lights emitted from the emitting face 4 from becoming too wide, with the result that the face of the document can be efficiently illuminated.

Figure 3:
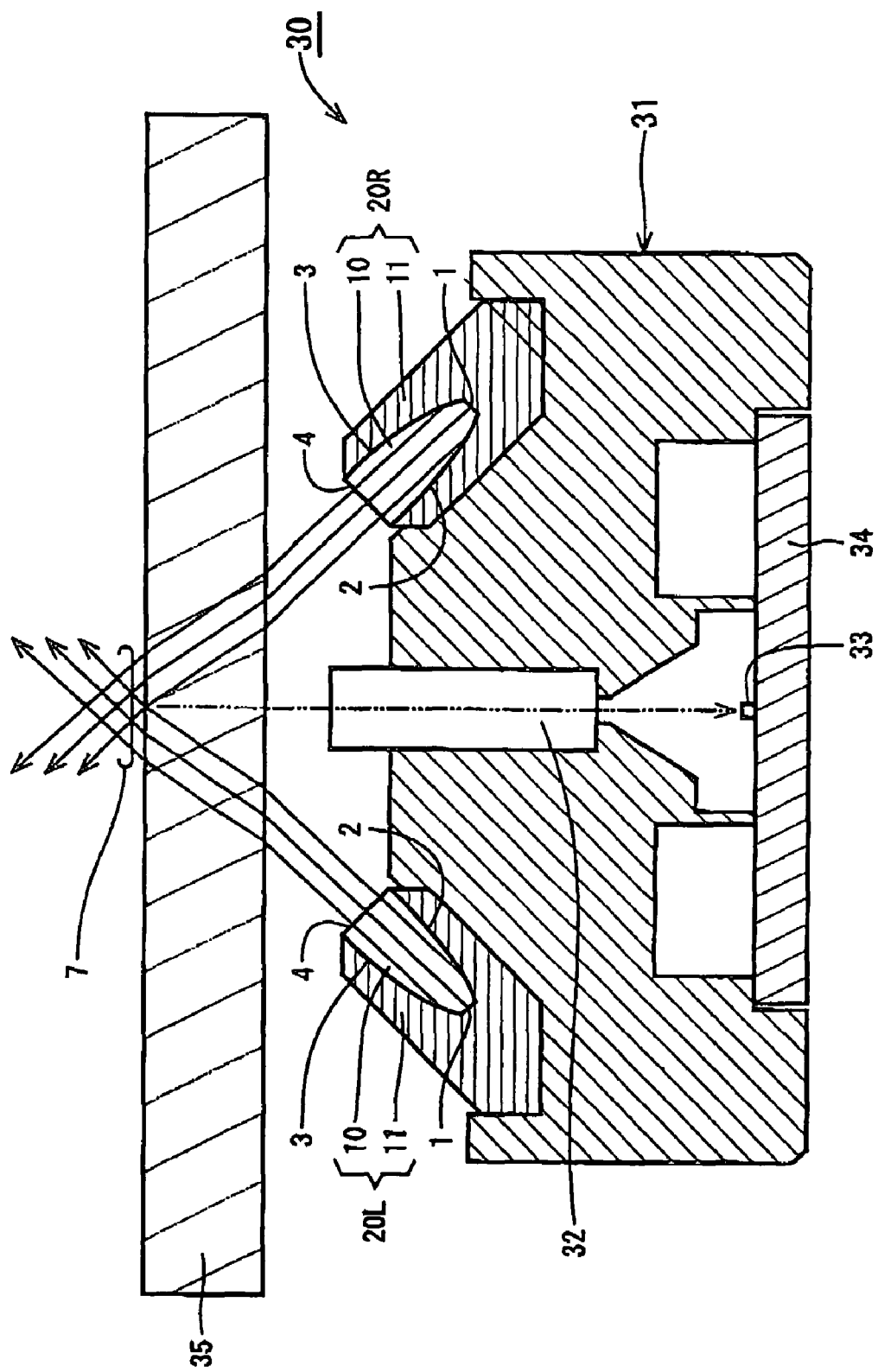
FIG. 3 is a sectional view of a contact image sensor (CIS) provided with a line illuminator in which the light guide according to the invention is incorporated.
Figure 4:
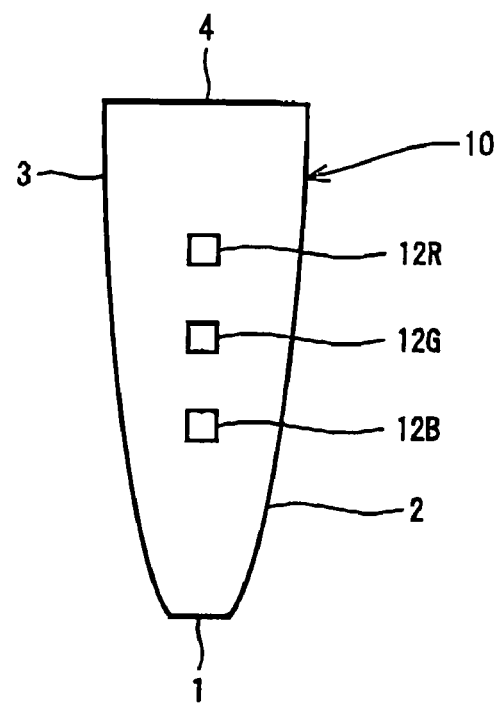
FIG. 4 is a diagram showing the fitting positions of light emitting diodes as light sources disposed on an end face of the light guide according to the invention.

FIG. 3 is a sectional view of a contact image sensor (CIS) provided with a line illuminator in which the light guide according to the invention is incorporated, and FIG. 4, a diagram showing the fitting positions of light emitting diodes as light sources disposed on an end face of the light guide according to the invention.

A contact image sensor (CIS) 30 shown in FIG. 3 is provided with a box 31; two pairs of line illuminators 20L and 20R are built into this box 31; a lens array 32 of an erecting unit magnification system is arranged in the box 31; and further a substrate 34 provided with a line image sensor 33 is fitted into the lower part of the box 31. Reference numeral 35 denotes a cover glass constituting a document mount.

Each of the line illuminators 20L and 20R comprises the light guide 10 shown in FIG. 1 and FIG. 2, a light guide case 11, and a light source board (not shown) provided with light emitting diodes 12R, 12G and 12B shown in FIG. 4. The light emitting diodes 12R, 12G and 12B respectively emit red, green and blue lights, and these light emitting diodes 12R, 12G and 12B are chip type diodes (LED chips).

In this mode for implementing the invention, as shown in FIG. 4, the light emitting diodes 12R, 12G and 12B are arranged in a row along the y axis (the optical axis). This makes the normal of the scattered dot pattern formed on the bottom face 1 of the light guide 10 coincide with the optical axis of the light emitting diodes 12R, 12G and 12B.

Lights from the light emitting diodes 12R, 12G and 12B propagate within the light guide 10, and cause scattered lights to be generated on the bottom face 1. As shown in FIG. 3, these scattered lights are reflected by the side faces 2 and 3, or directly emitted from the emitting face 4 and constitute illuminating lights 7 to illuminate the face to be read of the document, not shown, mounted on a cover glass 35.

The illuminating lights 7 reflected by the face to be read of the document, not shown, are detected by the line image sensor 33 via the cover glass 35 and the lens array 32. This causes the document to be read.

Since the illuminating lights emitted from the light guide 10 are confined to the range of ±15 degrees to the y axis (the optical axis), the expansion of the illuminating lights is prevented from becoming too wide even where the distance to the document is long. Therefore, the face of the document can be efficiently illuminated.

Figure 5:
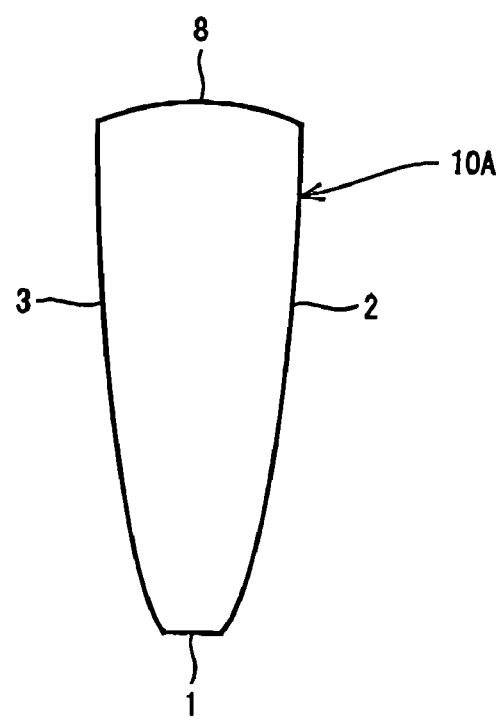
FIG. 5 is a diagram showing the sectional shape of another light guide according to the invention.

FIG. 5 is a diagram showing the sectional shape of another light guide according to the invention. A light guide 10A shown in FIG. 5 has an emitting face 8 made convex to reduce the expanding angle of emitted lights.

Figure 6:
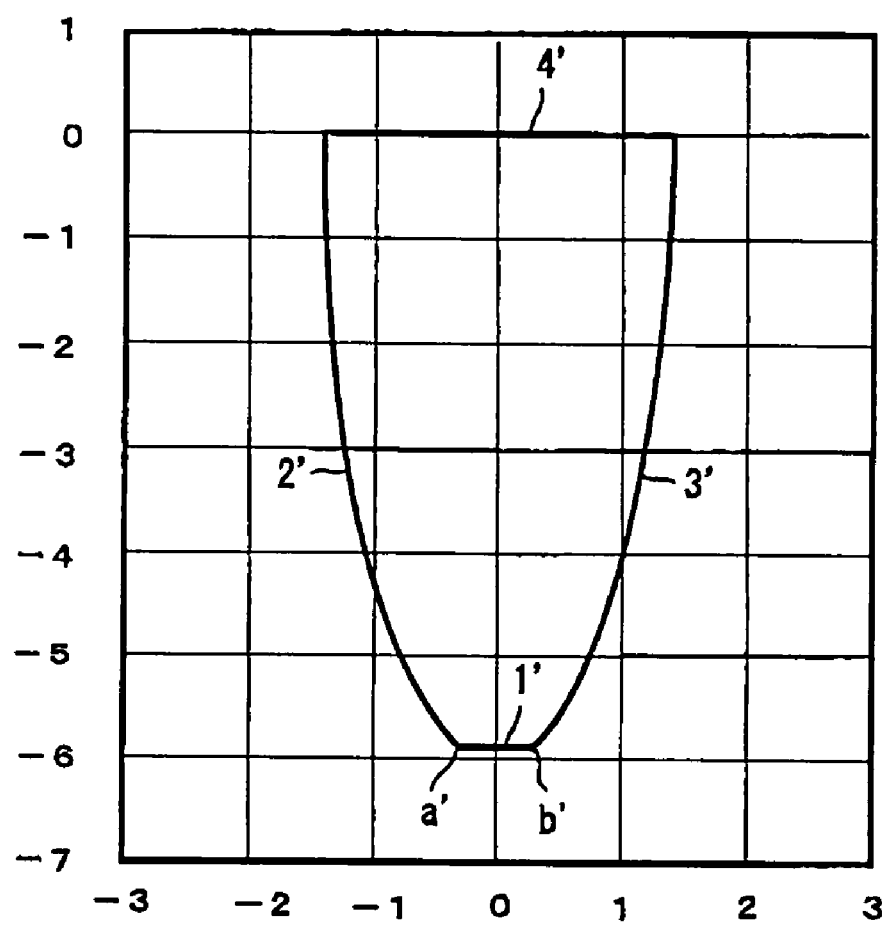
FIG. 6 is a diagram showing the sectional shape of another light guide according to the invention.

FIG. 6 is a diagram showing the sectional shape of another light guide according to the invention. The sectional shape in a direction orthogonal to the longitudinal direction of this light guide has side faces 2' and 3' each of an oval curve, a bottom face 1' and an emitting face 4', and the two ends of the bottom face 1' coincide with the respective focal points a' and b' of the side faces 2' and 3'.

Thus, to figure out the coordinate of a focal point from an oval curve $(x/1.6)^2+(y/6)^2=1$ having an aspect ratio of 1.6:6:

$$x=0, y=f=-(6\times6-1.6\times1.6)^{0.5}$$

is given. Wherein y is a variation in the section:

$$(f \leq y \leq 0), f=-(6\times6-1.6\times1.6)^{0.5}$$

and the oval curve in that section is:

$$x=1.6(1-(y/6)^2)^{0.5}$$

Now, x where y=f being supposed to be $x_0(=0.42667)$ by making the side faces of the light guide curves of which $$x=1.6(1-(y/6)^2)^{0.5}-x_0/2,$$

the two ends of the bottom face 1' are made coincident with the focal points a' and b' of the side faces (oval curves) 2' and 3'.

When light guides of the type shown in FIG. 6 were used as 20L and 20R shown in FIG. 3, substantially equal outputs to those where light guides of the type shown in FIG. 1 were used were detected by the sensor 33.

Besides the illustrated examples described above, the paraboloids 2 and 3 or the oval curves 2' and 3' may be made asymmetric between right and left to differentiate the right and left angles of expansion.

Figure 7:
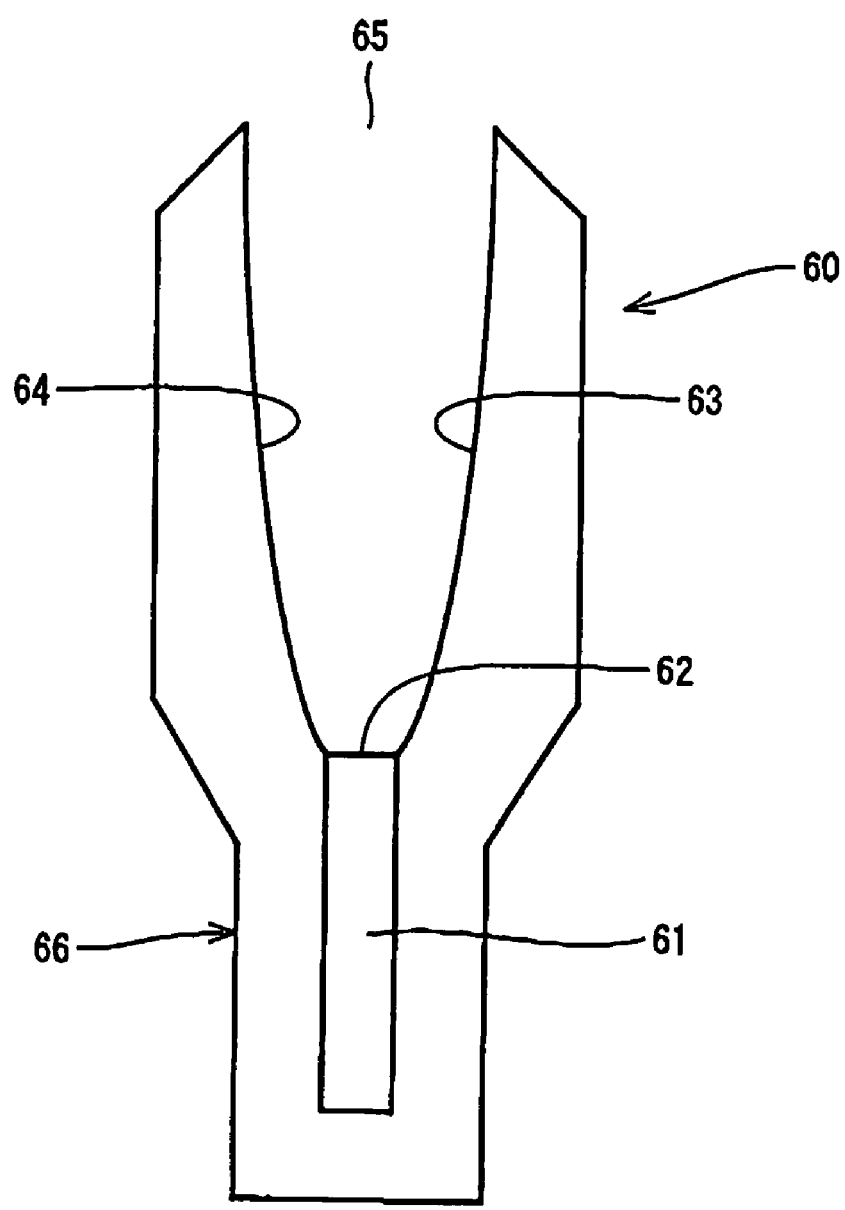
FIG. 7 is a diagram showing the sectional shape of a line illuminator provided with a compound parabolic reflector.

FIG. 7 is a diagram showing the sectional shape of a line illuminator provided with a compound parabolic reflector. A line illuminator 60 shown in FIG. 7 is such that lights emitted from the emitting face 62 of a light guide 61, whose sectional shape is rectangular for instance, are caused to be reflected by reflectors 63 and 64 having paraboloidal side faces to be emitted as illuminating lights from an opening 65. Reference numeral 66 denotes a plastic case. This line illuminator 60, as it has no reflective face in the refractive index medium, serves to restrain the angle of expansion. Thus, since the contents of the compound parabolic reflectors 63 and 64 are air, lights do not expand when they are emitted from the opening 65, which is the outlet of illuminating lights.

Although there have been described what are the present exemplary embodiments of the invention, it will be understood that variations and modifications may be made thereto within the spirit and scope of the appended claims.

The invention claimed is:

1. An elongate light guide having an end face on a longitudinal end thereof, an elongate emitting face extending longitudinally of the guide and an internal face extending longitudinally of the guide, the light guide emits lights incident on the end face from the emitting face in a line shape, while the lights are reflected by the internal face, wherein a sectional shape of the light guide in a direction orthogonal to the longitudinal direction of this light guide has two opposite parabolas or two oval curves, a line segment connecting the focal points of said two opposite parabolas or the focal points of said two oval curves, and a line segment corresponding to said emitting face.

2. The light guide according to claim 1, wherein a side face of the light guide on a side of said emitting face is substantially parallel to the optical axis.

3. The light guide according to claim 1, wherein the sectional shape of the light guide causes light emitted from the emitting face to be confined to a prescribed emission angle with respect to the emitting face.

4. The light guide according to claim 1, wherein the said line segment connecting the focal points corresponds to a bottom face of the light guide extending longitudinally thereof, is disposed opposite to said line segment corresponding to said emitting face, and has a scattering pattern formed thereon.

5. The light guide according to claim 1, wherein said end face is adapted to receive incident light thereon from a light source.

6. The light guide according to claim 1, wherein the line segment corresponding to said emitting face of the light guide has a larger width than that of the said line segment connecting the focal points.

7. An image reader comprising an illuminating unit including: an elongate light guide having an end face on a longitudinal end thereof, an elongate emitting face extending longitudinally of the guide and an internal face extending longitudinally of the guide, the light guide emits lights incident on the end face from the emitting face in a line shape, while the lights are reflected by the internal face, wherein a sectional shape of the light guide in a direction orthogonal to the longitudinal direction of this light guide has two opposite parabolas or two oval curves, a line segment connecting the focal points of said two opposite parabolas or the focal points of said two oval curves, and a line segment corresponding to said emitting face, a light source on an end face of the light guide, a lens array for converging on a light receiving element lights radiated from the illuminating unit toward a document and reflected by the document or transmitted by the document, and a box housing the illuminating unit and the lens array.

8. The image reader according to claim 7, including two of said illuminating units, and the illuminating units are so arranged as to cause lights emitted from the emitting faces of the light guides thereof to irradiate the same area of a face of the document being illuminated.

9. An image reader comprising an illuminating unit including: an elongate light guide having an end face on a longitudinal end thereof, an elongate emitting face extending longitudinally of the guide and an internal face extending longitudinally of the guide, the light guide emits lights incident on the end face from the emitting face in a line shape, while the lights are reflected by the internal face, wherein a sectional shape of the light guide in a direction orthogonal to the longitudinal direction of this light guide has two opposite parabolas or two oval curves, a line segment connecting the focal points of said two opposite parabolas or the focal points of said two oval curves, and a line segment corresponding to said emitting face, and a light source on an end face of the light guide, a lens array for converging on a light receiving element lights radiated from the illuminating unit toward a document and reflected by the document or transmitted by the document, and a box housing the illuminating unit and the lens array, wherein a side face of the light guide on a side of said emitting face is substantially parallel to the optical axis.

10. The image reader according to claim 9, including two of said illuminating units, and the illuminating units are so arranged as to cause lights emitted from the emitting faces of the light guides thereof to irradiate the same area of a face of the document being illuminated.

11. An elongate light guide comprising:

an end face;

an emitting face extending longitudinally of the guide and which emits light in a line shape; and an internal face;

wherein:

the light guide emits light incident on the end face from the emitting face while the light is reflected by the internal face;

the light emitted from the emitting face is confined to a prescribed emission angle with respect to the emitting face;

a sectional shape of the light guide in a direction orthogonal to the longitudinal direction of this light guide has two opposite parabolas or two oval curves, a line segment connecting the focal points of said two opposite parabolas or the focal points of said two oval curves, and a line segment corresponding to said emitting face; and said line segment connecting the focal points is disposed opposite to said line segment corresponding to said emitting face and has a scattering pattern formed thereon.

12. The light guide according to claim 11, wherein a side face of the light guide on a side of said emitting face is substantially parallel to an optical axis of the light guide.

13. The light guide according to claim 11, wherein said end face is adapted to receive incident light thereon from a light source.

14. The light guide according to claim 11, wherein the line segment corresponding to said emitting face of the light guide has a larger width than that of the said line segment connecting the focal points.

15. An elongate light guide comprising:

an end face;

an emitting face extending longitudinally of the guide and which emits light in a line shape; and an internal face;

wherein:

said end face is adapted to receive incident light thereon from a light source;

the light guide emits the light incident on the end face from the emitting face while the light is reflected by the internal face; and a sectional shape of the light guide in a direction orthogonal to the longitudinal direction of this light guide has two opposite parabolas or two oval curves, a line segment connecting the focal points of said two opposite parabolas or the focal points of said two oval curves, and a line segment corresponding to said emitting face.

16. The light guide according to claim 15, wherein the line segment corresponding to said emitting face of the light guide has a larger width than that of the said line segment connecting the focal points.

17. The light guide according to claim 15, wherein the said line segment connecting the focal points corresponds to a bottom face of the light guide extending longitudinally thereof, is disposed opposite to said line segment corresponding to said emitting face, and has a scattering pattern formed thereon.

* * * * *

UNITED STATES PATENT AND TRADEMARK OFFICE
CERTIFICATE OF CORRECTION

PATENT NO.        : 7,529,445 B2                                    Page 1 of 1
APPLICATION NO.   : 10/562336
DATED             : May 5, 2009
INVENTOR(S)       : Ikeda et al.

It is certified that error appears in the above-identified patent and that said Letters Patent is hereby corrected as shown below:

Title page:
In item (54), correct the title from "LIGHT GUIDE AND LINE ILLUMINATOR" to --LIGHT GUIDE AND IMAGE READER--.
After "*PrimaryExaminer–*" change "John A Ward" to --John A. Ward--.
In item (73), "Assignee:", change "Ltd, Osaka" to --Ltd., Osaka--.

Column 1:
Line 1, change "LIGHT GUIDE AND LINE ILLUMINATOR" to -- LIGHT GUIDE AND IMAGE READER--.

Column 2:
Line 10, change "instance, of illuminating" to --instance, illuminating--.

Signed and Sealed this

Twenty-second Day of December, 2009

David J. Kappos
*Director of the United States Patent and Trademark Office*